United States Patent
Slade et al.

(10) Patent No.: US 11,749,434 B2
(45) Date of Patent: Sep. 5, 2023

(54) STRAIN—OR MAGNETIC FIELD-BASED QUENCH DETECTION

(71) Applicant: Tokamak Energy Ltd, Abingdon (GB)

(72) Inventors: Robert Slade, Abingdon (GB); Rod Bateman, Abingdon (GB)

(73) Assignee: Tokamak Energy Ltd, Abingdon (GB)

( * ) Notice: Subject to any disclaimer, the term of this patent is extended or adjusted under 35 U.S.C. 154(b) by 0 days.

(21) Appl. No.: 17/776,522

(22) PCT Filed: Nov. 10, 2020

(86) PCT No.: PCT/EP2020/081677
§ 371 (c)(1),
(2) Date: May 12, 2022

(87) PCT Pub. No.: WO2021/094333
PCT Pub. Date: May 20, 2021

(65) Prior Publication Data
US 2022/0384073 A1    Dec. 1, 2022

(30) Foreign Application Priority Data

Nov. 12, 2019 (GB) ...................... 1916454

(51) Int. Cl.
*H01F 6/02* (2006.01)
*G21B 1/05* (2006.01)
*H01F 6/06* (2006.01)

(52) U.S. Cl.
CPC ............... *H01F 6/02* (2013.01); *G21B 1/057* (2013.01); *H01F 6/06* (2013.01)

(58) Field of Classification Search
CPC ... H01F 6/02; H01F 6/00; G21B 1/057; Y02E 30/10; H02H 7/001; H02H 9/023; H01H 6/06; H01L 39/16
(Continued)

(56) References Cited

U.S. PATENT DOCUMENTS

2010/0254047 A1   10/2010 Martchevskii
2010/0273657 A1*  10/2010 Martchevskii .......... H01L 39/16
                                                            29/599
(Continued)

FOREIGN PATENT DOCUMENTS

CN   110 261 799 A    9/2019
EP   2 755 216 A1     7/2014
(Continued)

OTHER PUBLICATIONS

Search Report issued from the United Kingdom Patent Office for related Application No. GB1916454.0 dated May 5, 2020 (4 Pages).
International Search Report with Written Opinion for related Application No. PCT/EP2020/081677 dated Feb. 16, 2021 (27 Pages).
International Preliminary Report on Patentability related Application No. PCT/EP2020/081677 dated Dec. 17, 2021 (14 Pages).
(Continued)

*Primary Examiner* — Danny Nguyen
(74) *Attorney, Agent, or Firm* — Michael Best & Friedrich LLP

(57) ABSTRACT

A method of detecting pre-quench conditions in a superconducting magnet comprising an HTS field coil. The field coil comprises a plurality of turns comprising HTS material and metallic stabilizer; and conductive material connecting the turns such that current can be shared radially between turns via the conductive material. Strain is monitored for the HTS field coil and/or support structures of the HTS field coil. The monitored strain is compared to an expected strain during normal operation of the magnet. In response to the comparison, it is determined whether the field coil is in pre-quench conditions. A similar method is provided where the magnetic field of the HTS field coil is monitored to detect pre-quench conditions, instead of the strain.

6 Claims, 2 Drawing Sheets

(58) Field of Classification Search
USPC .............................................. 361/19; 505/162
See application file for complete search history.

(56) References Cited

U.S. PATENT DOCUMENTS

| | | | |
|---|---|---|---|
| 2011/0177953 A1* | 7/2011 | Llambes | H02H 9/023 |
| | | | 29/599 |
| 2014/0268130 A1 | 9/2014 | Omichi et al. | |
| 2019/0252104 A1 | 8/2019 | Slade | |

FOREIGN PATENT DOCUMENTS

| | | |
|---|---|---|
| WO | 2018/078327 A1 | 5/2018 |
| WO | 2019/150123 A1 | 8/2019 |

OTHER PUBLICATIONS

Scurti et al., Quench detection for high temperature superconductor magnets: a novel technique based on Rayleigh-backscattering interrogated optical fibers, Superconductor Science and Technology, vol. 29 No. 3 Published Jan. 22, 2016 (4 Pages).

Scurti et al., "Self-monitoring SMART (RE)Ba2 Cu3 O7-x conductor via integrated optical fibers", Superconductor Science Technology vol. 30 No. 11, Published Oct. 5, 2017 (4 Pages).

Zhu et al., "Design, dynamic simulation and construction of a hybrid HTS SMES (high-temperture superconduction magnetic energy storage systems) for Chinese power grid", Science Direct Energy vol. 51, Mar. 1, 2013, pp. 184-192.

\* cited by examiner

STRAIN—OR MAGNETIC FIELD-BASED QUENCH DETECTION

CROSS-REFERENCE TO RELATED APPLICATION(S)

This application is a national phase entry of PCT/EP2020/081677, filed on Nov. 10, 2020, which claims priority to GB 1916454.0, filed on Nov. 12, 2019, the entire contents of each of which are fully incorporated herein by reference.

FIELD OF THE INVENTION

The present invention relates to quench detection in high temperature superconducting magnet systems, and in particular to methods of quench detection, and magnet systems configured to implement the methods.

BACKGROUND

The challenge of producing fusion power is hugely complex. Many alternative devices apart from tokamaks have been proposed, though none have yet produced any results comparable with the best tokamaks currently operating such as JET.

World fusion research has entered a new phase after the beginning of the construction of ITER, the largest and most expensive (c15bn Euros) tokamak ever built. The successful route to a commercial fusion reactor demands long pulse, stable operation combined with the high efficiency required to make electricity production economic. These three conditions are especially difficult to achieve simultaneously, and the planned programme will require many years of experimental research on ITER and other fusion facilities, as well as theoretical and technological research. It is widely anticipated that a commercial fusion reactor developed through this route will not be built before 2050.

To obtain the fusion reactions required for economic power generation (i.e. much more power out than power in), the conventional tokamak has to be huge (as exemplified by ITER) so that the energy confinement time (which is roughly proportional to plasma volume) can be large enough so that the plasma can be hot enough for thermal fusion to occur. WO 2013/030554 describes an alternative approach, involving the use of a compact spherical tokamak for use as a neutron source or energy source. The low aspect ratio plasma shape in a spherical tokamak improves the particle confinement time and allows net power generation in a much smaller machine. However, a small diameter central column is a necessity, which presents challenges for design of the plasma confinement magnet. High temperature superconductor (HTS) field coils are a promising technology for such magnets.

Superconducting materials are typically divided into "high temperature superconductors" (HTS) and "low temperature superconductors" (LTS). LTS materials, such as Nb and NbTi, are metals or metal alloys whose superconductivity can be described by BCS theory. All low temperature superconductors have a critical temperature (the temperature above which the material cannot be superconducting even in zero magnetic field) below about 30K. The behaviour of HTS material is not described by BCS theory, and such materials may have critical temperatures above about 30K (though it should be noted that it is the physical differences in superconducting operation and composition, rather than the critical temperature, which define HTS and LTS material). The most commonly used HTS are "cuprate superconductors"—ceramics based on cuprates (compounds containing a copper oxide group), such as BSCCO, or ReBCO (where Re is a rare earth element, commonly Y or Gd). Other HTS materials include iron pnictides (e.g. FeAs and FeSe) and magnesium diborate ($MgB_2$).

ReBCO is typically manufactured as tapes, with a structure as shown in FIG. 1. Such tape 100 is generally approximately 100 microns thick, and includes a substrate 101 (typically electropolished hastelloy approximately 50 microns thick), on which is deposited by IBAD, magnetron sputtering, or another suitable technique a series of buffer layers known as the buffer stack 102, of approximate thickness 0.2 microns. An epitaxial ReBCO-HTS layer 103 (deposited by MOCVD or another suitable technique) overlays the buffer stack, and is typically 1 micron thick. A 1-2 micron silver layer 104 is deposited on the HTS layer by sputtering or another suitable technique, and a copper stabilizer layer 105 is deposited on the tape by electroplating or another suitable technique, which often completely encapsulates the tape.

The substrate 101 provides a mechanical backbone that can be fed through the manufacturing line and permit growth of subsequent layers. The buffer stack 102 is required to provide a biaxially textured crystalline template upon which to grow the HTS layer, and prevents chemical diffusion of elements from the substrate to the HTS which damage its superconducting properties. The silver layer 104 is required to provide a low resistance interface from the ReBCO to the stabiliser layer, and the stabiliser layer 105 provides an alternative current path in the event that any part of the ReBCO ceases superconducting (enters the "normal" state).

In addition, "exfoliated" HTS tape can be manufactured, which lacks a substrate and buffer stack, and instead has silver layers on both sides of the HTS layer. Tape which has a substrate will be referred to as "substrated" HTS tape.

HTS tapes may be arranged into HTS cables. An HTS cable comprises one or more HTS tapes, which are connected along their length via conductive material (normally copper). The HTS tapes may be stacked (i.e. arranged such that the HTS layers are parallel), or they may have some other arrangement of tapes, which may vary along the length of the cable. Notable special cases of HTS cables are single HTS tapes, and HTS pairs. HTS pairs comprise a pair of HTS tapes, arranged such that the HTS layers are parallel. Where substrated tape is used, HTS pairs may be type-0 (with the HTS layers facing each other), type-1 (with the HTS layer of one tape facing the substrate of the other), or type-2 (with the substrates facing each other). Cables comprising more than 2 tapes may arrange some or all of the tapes in HTS pairs. Stacked HTS tapes may comprise various arrangements of HTS pairs, most commonly either a stack of type-1 pairs or a stack of type-0 pairs and (or, equivalently, type-2 pairs). HTS cables may comprise a mix of substrated and exfoliated tape.

One common type of HTS coil is a "pancake coil", where HTS cables 201 are wrapped to form a flat coil, in a similar manner to a spool of ribbon. Pancake coils may be made with an inner perimeter which is any 2 dimensional shape. Often, pancake coils are provided as a "double pancake coil", which comprises two pancake coils wound in opposite sense, with insulation between the pancake coils, and with the inner terminals connected together. This means that voltage only needs to be supplied to the outer terminals which are generally more accessible, to drive current through the turns of the coil and generate a magnetic field.

HTS coils may be "insulated"—having electrically insulating material between the turns of the coil, or "non insulated", where the turns of the coil are electrically connected radially, as well as along the cables (e.g. by connecting the copper stabiliser layers of the cables by soldering or by direct contact). In addition, coils may be "partially insulated"—i.e. having a layer between the coils with a resistance intermediate between the insulators used for an insulated coil, or the metals which join cables of a non-insulated coil. For example, the partial insulated may be a thicker layer of a relatively high resistance metal, or a semiconductor, or a composite layer constructed to give a relatively high resistance. Alternatively, partially insulated coils may be formed by providing other radial current paths made from conductive material—e.g. on the side of the field coil.

SUMMARY

According to a first aspect, there is provided a method of detecting pre-quench conditions in a superconducting magnet comprising an HTS field coil. The field coil comprises a plurality of turns comprising HTS material and metallic stabilizer; and conductive material connecting the turns such that current can be shared radially between turns via the conductive material. Strain is monitored for the HTS field coil and/or support structures of the HTS field coil. The monitored strain is compared to an expected strain during normal operation of the magnet. In response to the comparison, it is determined whether the field coil is in pre-quench conditions.

According to a second aspect, there is provided a method of detecting pre-quench conditions in a superconducting magnet comprising an HTS field coil. The field coil comprises a plurality of turns comprising HTS material and metallic stabilizer; and a conductive material connecting the turns such that current can be shared radially between turns via the conductive material. A magnetic field of the HTS field coil is monitored. The monitored magnetic field is compared to an expected magnetic field during normal operation of the magnet. In response to said comparison, it is determined whether the field coil is in pre-quench conditions.

According to a third aspect, there is provided a high temperature superconducting, HTS, magnet system comprising an HTS field coil. The HTS field coil comprises a plurality of turns comprising HTS material and metallic stabilizer; and conductive material connecting the turns, such that current can be shared between turns via the conductive material. The HTS magnet system further comprises a quench protection system and one or more strain sensors located on the HTS field coil or on a structural support of the HTS field coil. The quench protection system is configured to monitor strain measurements of the one or more strain sensors; compare the strain measurements to an expected strain during normal operation of the magnet; and in response to said comparison, determine whether the field coil is in pre-quench conditions.

According to a fourth aspect, there is provided a high temperature superconducting, HTS, magnet system comprising an HTS field coil. The HTS field coil comprises a plurality of turns comprising HTS material and metallic stabilizer; and conductive material connecting the turns, such that current can be shared between turns via the conductive material. The HTS magnet system further comprises a quench protection system and one or more magnetic field sensors. The quench protection system is configured to monitor magnetic field measurements of the one or more magnetic field sensors; compare the magnetic field measurements to an expected magnetic field during normal operation of the magnet; and in response to said comparison, determine whether the field coil is in pre-quench conditions.

According to a fifth aspect, there is provided a tokamak comprising an HTS magnet system according to the third of fourth aspect, wherein a toroidal field coil or poloidal field coil of the tokamak comprises the HTS field coil.

DETAILED DESCRIPTION

Figure 1:
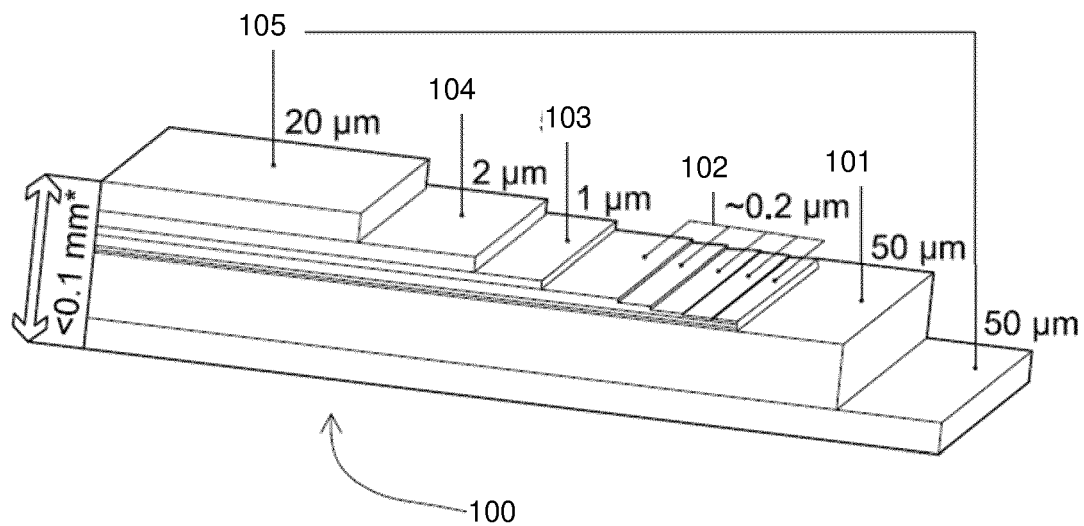
FIG. 1 is a schematic diagram of an HTS tape.

Partially insulated and non-insulated coils, i.e. coils where there is a (non-superconducting) conductive path between turns which allows current flow radially between turns, are generally resistant to quenching (the magnet becoming non-superconducting during operation) and to damage during a quench (since this partly results from arcing between the turns in an insulated coil). However, it has been found that significant damage can result from quenches in partially and non-insulated coils due to the large shifts in the magnetic field and the resulting strain which result from the current transferring from the spiral path (i.e. in the HTS of the coil) to the radial path (i.e. directly through the metallic connection or the partial insulation). This is particularly notable in magnet systems with multiple coil sections—e.g. toroidal field (TF) coil sets for tokamaks. If one "limb" of the TF coil quenches, then the resulting magnetic imbalance can cause significant damage to the whole TF coil set due to the large imbalanced forces.

While the large destructive shifts of strain and magnetic field are clearly a problem, the below description proposes using the smaller strain and field shifts which occur during the onset of a quench due to current sharing between turns to detect the incipient quench and provide enough warning to safely ramp down the magnet and reduce or prevent the damage caused by the quench. In general, quench detection involves detecting "pre-quench conditions", i.e. conditions which are likely to cause a quench, or signs such as current sharing between the coils or hot-spots within the coils which indicate that a quench may occur soon.

Quench detection may be performed by monitoring either or both of the strain in each coil of the set (and/or in nearby structural components) or the magnetic field close to each coil in the set. In a broad example, pre-quench conditions may be signalled when there is any deviation (e.g. greater than the measurement accuracy of the strain gauges used) from the expected measurements during magnet operation. Alternatively, pre-quench conditions may be signalled when any such deviation is greater than a threshold (e.g. 1% greater than the expected measurement). This would be suitable for a system in which the potential cost of a larger number of unnecessary shutdowns is worth bearing to save the potential costs of an uncontrolled quench.

Alternatively, the quench protection system could be configured to respond only to certain measurements by the strain and/or field sensors, e.g. to a magnetic field perpendicular to the magnetic field of the coil during normal operations (an "off axis" field), or to strain in an unexpected component or an unexpected direction (where "unexpected"

means "would not be expected during normal operation"—i.e. it may be expected in the event of a quench or pre-quench conditions).

In multi-coil systems, detection of pre-quench conditions in one coil may be based on changes in the strain in and around another coil of the system—this is because shifts in the magnetic field of the first coil will cause shifts in the balance of forces on the other coils in the system. This applies whether the multiple coils are part of the same magnet (e.g. the individual limbs of a TF coil set).

The judgement of "strain/field during normal operation" may be based on the power currently being supplied to the coil—e.g. the quench protection system may receive as input the details of the current supplied to each coil, determine a strain and/or field model on the basis of these currents (e.g. by reference to a look-up table or by calculation in a simple model), and compare the readings of the strain and/or field sensors to the strain and/or field model. As noted above, pre-quench conditions may be signalled (and quench prevention procedures such as ramping down the magnet engaged) either for any significant deviation from the model, or for deviations of certain types—e.g. perpendicular to the expected field/strain.

In a balanced multi-coil system, i.e. a system in which the strain/magnetic field pattern should be the same for each coil during normal operation, the expected strain/magnetic field during normal operation which is used for comparison may be based on the measured strain/magnetic field of the other coils—i.e. the expected strain pattern is that the strain on each coil is identical to within the range of gauge accuracy. A particular pattern of deviations in strain may indicate pre-quench conditions—e.g. where equal and opposite deviations are present on the two coils either side of a coil, with reduced equal and opposite deviations on the next nearest neighbours.

Similar considerations apply to systems which are not fully balanced, but have symmetry—e.g. where a multi-coil system has two sets of coils which have reflective symmetry with each other, the expected strain/magnetic field may be based on the measured strain/magnetic field of each coil, with the expectation that the strain/magnetic field pattern should also have reflective symmetry.

In a typical TF coil of a small spherical tokamak (plasma major radius approximately 1.5 m), the expected strain may be up to 0.25% (2500 microstrain), and the sensitivity of the strain sensors may be better than 0.01 microstrain. As such, very precise, high-resolution determination of the strain on the magnet is possible.

Figure 2:
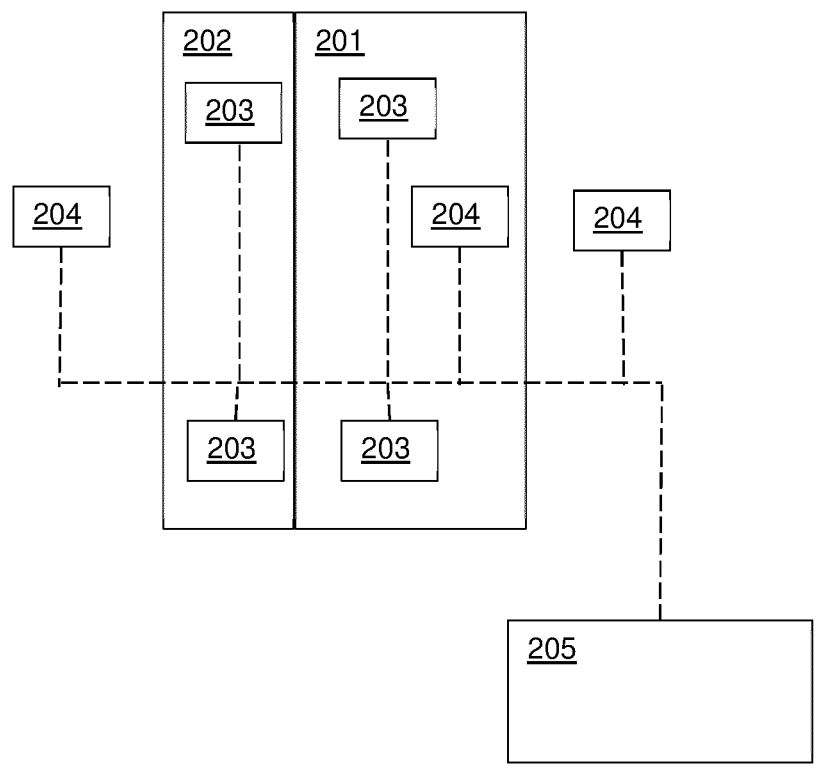
FIG. 2 is a schematic diagram of a superconducting magnet system.

FIG. 2 shows an exemplary superconducting magnet system, in schematic form. The magnet system comprises:
an HTS field coil 201, having support structures 202;
a plurality of strain sensors 203 on the HTS field coil 201 and the support structures 202;
a plurality of magnetic field sensors 204 positioned to monitor the magnetic field produced by the HTS field coil 201;
a quench protection system 205 configured to:
monitor measurements from the strain sensors and magnetic field sensors;
compare the monitored measurements to an expected strain profile during normal operation and an expected magnetic field profile during normal operation;
determine whether or not the field coil is in pre-quench conditions on the basis of that comparison.

Figure 3:
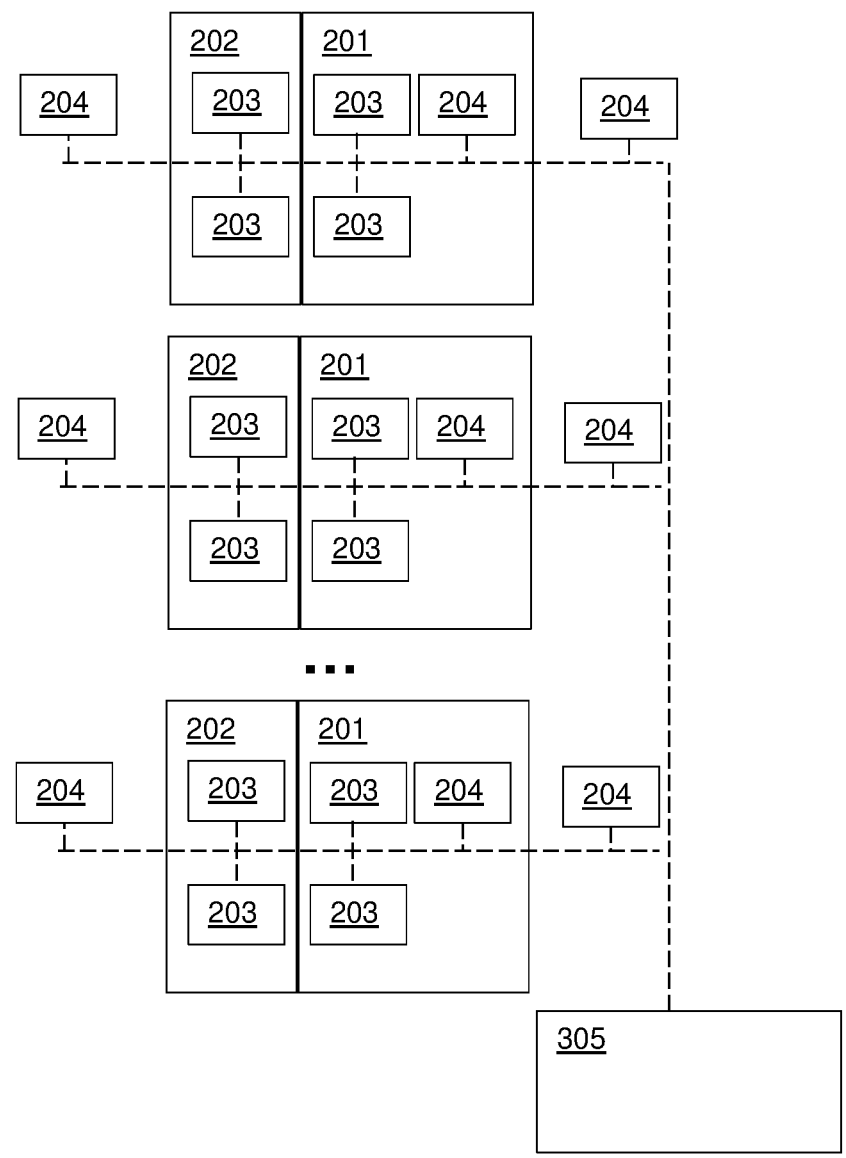
FIG. 3 is a schematic diagram of a superconducting magnet system comprising several coils.

FIG. 3 shows a multi-coil magnet system, comprising a plurality of coils 201 as shown in FIG. 2 (with associated support structures 202, and sensors 203, 204). The quench protection system 305 is configured to:
monitor measurements from the strain sensors and magnetic field sensors;
compare the monitored measurements to an expected strain profile during normal operation and an expected magnetic field profile during normal operation;
determine whether or not each field coil is in pre-quench conditions on the basis of that comparison, using both the sensors on each field coil, and the sensors on the other field coils.

As explained in the more detailed examples above, the magnet system could also be constructed with only strain sensors or only magnetic field sensors, and with the quench protection system configured to consider only strain or magnetic field (as appropriate).

The quench protection system may be further configured to activate some manner of quench prevention or mitigation following a determination that the field coil is in pre-quench conditions—e.g. to trigger dumping of the magnet current to a cold mass, such as by switching to a resistive load or deliberately quenching a large portion of the magnet.

The invention claimed is:

1. A method of detecting conditions likely to cause a quench in a superconducting magnet comprising a plurality of HTS field coils, each field coil comprising:
a plurality of turns comprising HTS material and metallic stabilizer; and
a conductive material connecting the turns such that current can be shared radially between turns via the conductive material;
the method comprising:
monitoring strain and/or a magnetic field of each HTS field coil;
comparing the monitored strain and/or magnetic field for each HTS field coil to the monitored strain and/or magnetic field of at least one other HTS field coil of the plurality of HTS field coils; and
in response to said comparison, determining whether one or more of the HTS field coils is likely to quench.

2. The method according to claim 1, wherein determining whether one or more of the HTS field coils is likely to quench comprises one or more of:
determining that one of the HTS field coils is likely to quench if the monitored strain or magnetic field differs from the strain or magnetic field of at least one other HTS field coil by more than a threshold value; and
determining that one of the HTS field coils is likely to quench if the monitored strain or magnetic field has a component perpendicular to the strain or magnetic field of at least one other HTS field coil with a magnitude greater than a threshold value.

3. The method according to claim 2, wherein the threshold value is a predetermined proportion of the strain or magnetic field of the at least one other HTS field coil.

4. A high temperature superconducting, HTS, magnet system comprising a plurality of HTS field coils, each HTS field coil comprising:
a plurality of turns comprising HTS material and metallic stabilizer;
a conductive material connecting the turns, such that current can be shared between turns via the conductive material;
the HTS magnet system further comprising a quench protection system and a plurality of sensors comprising:
one or more strain sensors located on each HTS field coil or on a structural support of each HTS field coil, and/or one or more magnetic field sensors configured to monitor the magnetic field of each HTS field coil;

wherein the quench protection system is configured to:

monitor strain and/or magnetic field measurements for each HTS coil using the plurality of sensors;

compare the strain and/or magnetic field measurements for each HTS coil to a strain and/or magnetic field measurements of at least one other HTS field coil of the plurality of HTS field coils; and in response to said comparison, determine whether one or more of the HTS field coils is likely to quench.

5. The HTS magnet system according to claim 4, wherein the conductive material is contained within a partially insulating layer comprising any of:

an intermittent layer of insulation;

a semiconductor;

a metal strip having an intermittent layer of insulation on each side; and a metal-insulator transition material.

6. A tokamak comprising the HTS magnet system according to claim 5, wherein the plurality of HTS field coils are toroidal field coils of the tokamak.

\* \* \* \* \*

UNITED STATES PATENT AND TRADEMARK OFFICE
CERTIFICATE OF CORRECTION

| | |
|---|---|
| PATENT NO. | : 11,749,434 B2 |
| APPLICATION NO. | : 17/776522 |
| DATED | : September 5, 2023 |
| INVENTOR(S) | : Slade et al. |

It is certified that error appears in the above-identified patent and that said Letters Patent is hereby corrected as shown below:

In the Claims

On Column 7, Line 21, Claim 8, replace "claim 5" with --claim 4--

Signed and Sealed this
Twenty-seventh Day of February, 2024

Katherine Kelly Vidal
*Director of the United States Patent and Trademark Office*